United States Patent

Momiyama

[11] 4,045,128
[45] Aug. 30, 1977

[54] TELEPHOTO OBJECTIVE

[75] Inventor: Kikuo Momiyama, Yokohama, Japan

[73] Assignee: Canon Kabushiki Kaisha, Tokyo, Japan

[21] Appl. No.: 570,958

[22] Filed: Apr. 22, 1975

[30] Foreign Application Priority Data

Apr. 25, 1974 Japan .................................. 49-46920
June 28, 1974 Japan .................................. 49-74168

[51] Int. Cl.² ............................................... G02B 9/60
[52] U.S. Cl. .................................. 350/216; 350/214; 350/255
[58] Field of Search ................... 350/214, 216, 255; 354/197

[56] References Cited

U.S. PATENT DOCUMENTS 2,503,789  4/1950  Wood et al. ................. 354/197 X
3,854,797  12/1974  Yokota ............................ 350/214

Primary Examiner—Paul A. Sacher
Attorney, Agent, or Firm—Toren, McGeady and Stanger

[57] ABSTRACT

A telephoto objective comprising a stationary convergent front lens group and a rear lens group which includes a lens member axially movable for focusing behind a front lens member which remains stationary during focusing, and an operating mechanism therefor. In order to achieve excellent stability of the various aberrations and particularly spherical aberration throughout the focusing range, compensation for the residual aberrations introduced by the front lens group is concentrated in the stationary front member of the rear lens group, while the movable rear member is configured to provide minimized variation of aberrations by constructing these two members as being divergent with their front surfaces convex to the object. In this particular arrangement, the movable member is moved toward the image plane as the objective is focused from the position for an object at infinity to the position for a close object.

22 Claims, 17 Drawing Figures

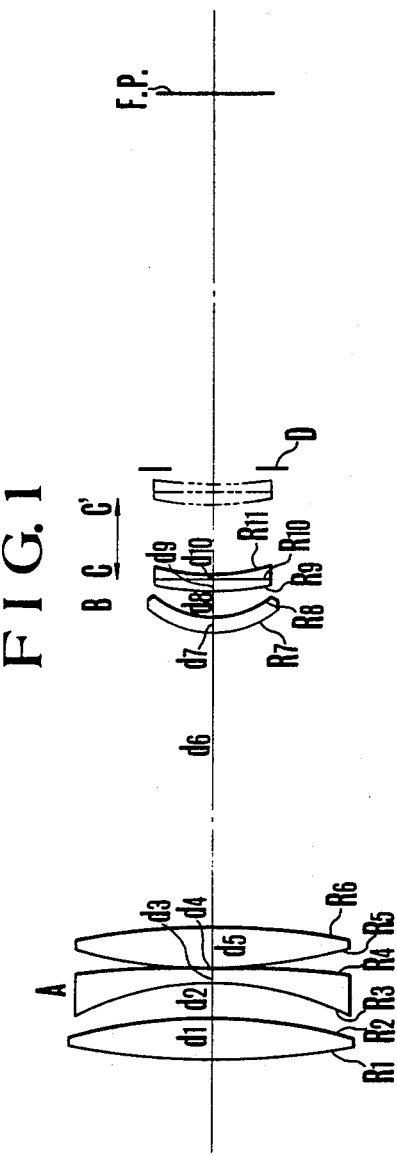
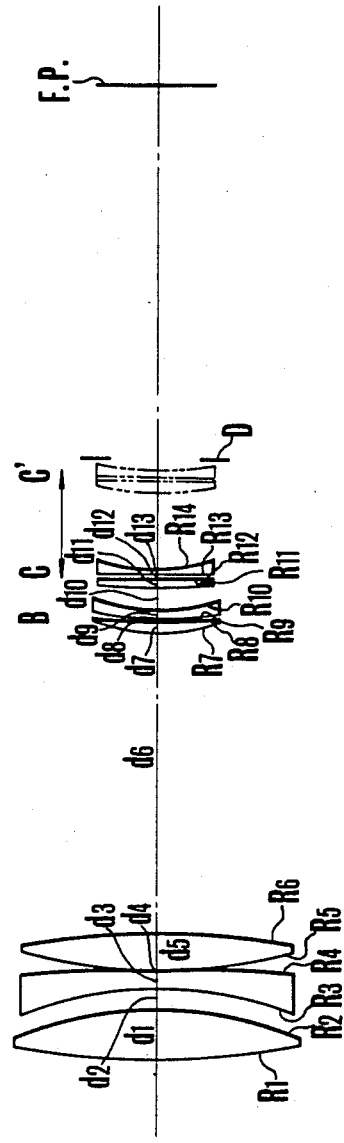

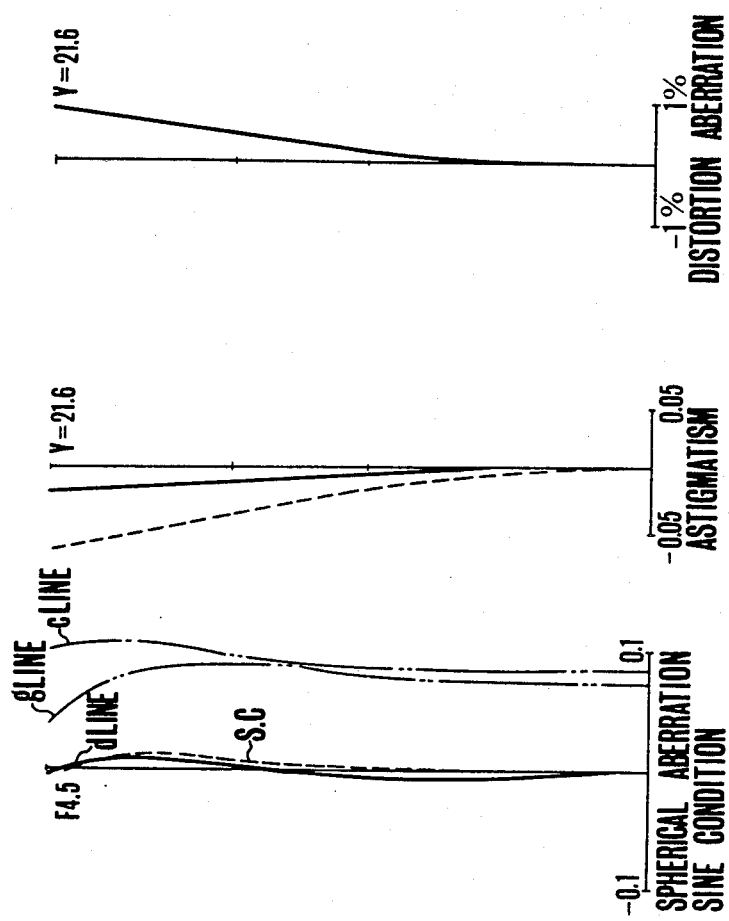

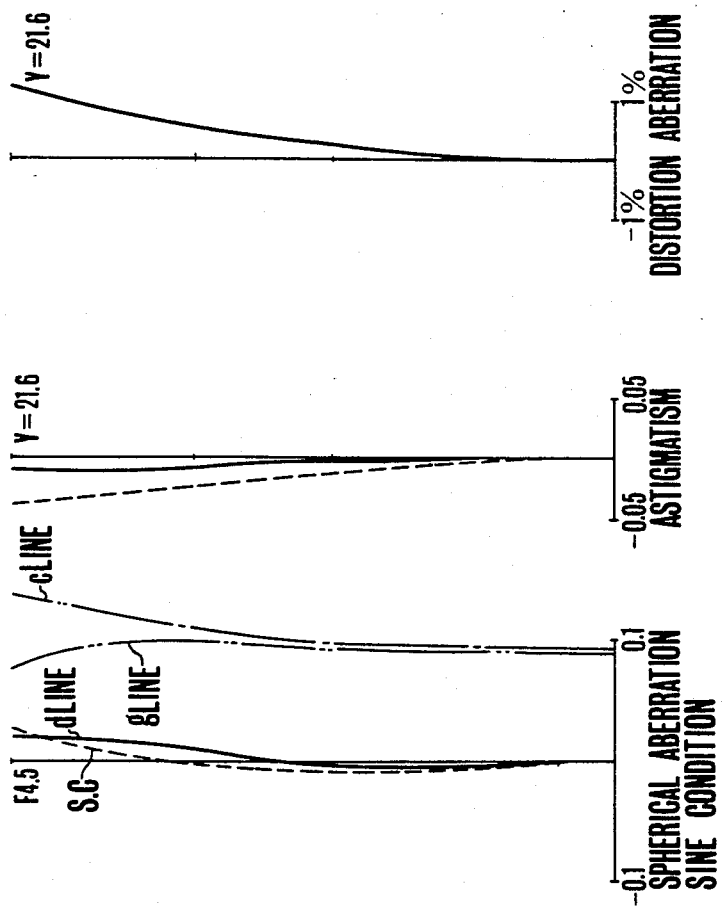

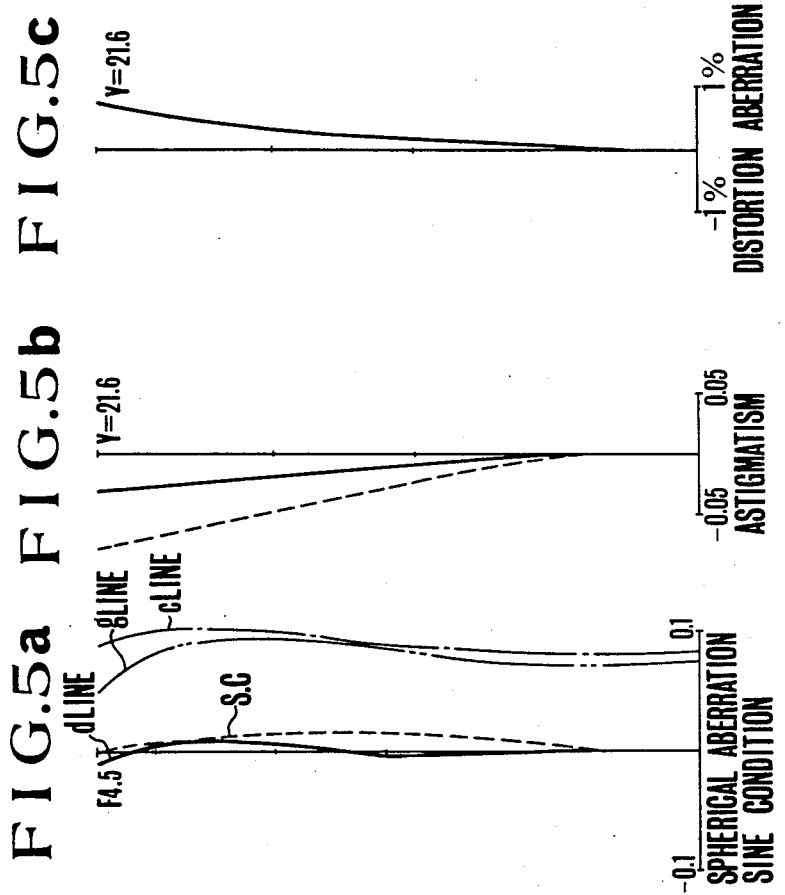

TELEPHOTO OBJECTIVE

BACKGROUND OF THE INVENTION

This invention relates to optical objectives for photographic devices, and more particularly to a telephoto objective comprising a stationary front lens group and a rear lens group which includes a member axially movable to focus while still maintaining improved stabilization of the aberrations throughout the focusing range.

In general, the focusing of an optical objective is effected by axially moving the objective bodily with reference to the image plane. But this may be otherwise achieved by axial movement of a part of the objective, for example, either the front, or the rear lens group thereof with reference to the other part which remains stationary during focusing. In telephoto objectives, if made bodily movable for focusing purposes, the amount of movement of the objective throughout the focusing range tends to increase, and this in turn calls for increases in the weight and bulk of the objective and the driving torque of its focusing mechanism as well as in the production cost thereof, thus it being made more difficult to keep the weight and bulk of the complete objective including its mechanical mounting and focusing mechanism within easily manageable proportion.

With a telephoto objective having the provision for focusing made at a rear part of the lens system, it is possible to minimize the movement of the focusing part and to employ a focusing mechanism of small size and weaker driving torque, because the focusing part comprises only a fraction of the weight and bulk of the complete objective, thereby giving an advantage of facilitating high-speed focus adjustment of the objective. Another advantage deriving from the selection of the rear lens group of the objective for employment as the movable part for focusing purposes is that the front lens group which is of a relatively large weight and bulk may be supported in fixedly secured relation with a camera body to minimize the probability of producing a jiggle or oscillation of the image at the focal plane by small accidental motions of the objective and camera assembly which is otherwise encountered particularly when the objective is telephoto in nature. However, this system has a disadvantage that variation of the aberration particularly variation of the spherical aberration due to the movement of the lens is large, and the image forming ability is low. Further, in order for an objective to embody an advantageously small overall length, a convergent lens group is usually selected for employment as the front part thereof in combination with a divergent rear lens group having design parameters determined so as to cancel out the residual spherical aberration introduced by the front lens group in a focusing position for an object at infinity. However, as the objective is focused from this position to a position for a close object, the axial separation between the front and rear lens groups is increased with decrease in the hight of incidence of an axial ray upon the rear lens group, so that occurrence of the positive spherical aberration is less, while varying the value of the spherical aberration to a remarkable extent. In this respect, it is well known that this arrangement is disadvantageous for stabilization of the image aberrations throughout the focusing range.

SUMMARY OF THE INVENTION

The present invention has for a general object to provide the above-mentioned advantages in the case of a telephoto objective having the provision for focusing made at the rear part thereof, while still proving improved stabilization of the aberrations throughout the focusing range.

A concomitant object of the invention is to provide a focusing mechanism for use with an telephoto objective of the character described which assists in high-speed focus adjustment thereof.

In order to avoid the above defect in the focusing system by the movement of rear lens group, it is necessary to lessen the occurrence of the aberration particularly the spherical aberration in the rear lens group, but if the aberration is lessened in this way the spherical aberration of the whole lens system is remarkably undercorrection.

The telephoto objective of the invention is characterized in comprising a convergent front lens group and a rear lens group which includes a lens member axially movable to effect focusing in front of, or behind a lens member which remains stationary during focusing. This particular arrangement gives rise to the possibility of cancelling out the residual aberrations introduced by the convergent front lens group by suitable design of the stationary lens member of the rear lens group and gives high standard of stabilization of the various aberrations and particularly spherical aberration throughout the focusing range provided that the movable member is designed to give a good standard of stabilization of the aberrations throughout the focusing range.

Further, a good compromise has been achieved between the requirements of providing a large range of focusing adjustments with relatively small axial translations of the movable member of the rear lens group and of providing a distribution of powers between the stationary and movable parts of the objective which effects achievement of a high standard of aberration correction.

BRIEF DESCRIPTION OF THE DRAWINGS

FIG. 1 is a diagrammatic view of an example of a telephoto objective according to an embodiment of the invention in two focusing positions.

FIG. 2 is a similar view of another example of the embodiment of the invention.

FIGS. 3a–3c is a graphic representation of aberration achieved in the example of FIG. 1 when focused for an infinite object distance.

FIGS. 4a–4c is a similar representation when focused for an object distance of 1,000 millimeters.

FIGS. 5a–5c is a graphic representation of aberration achieved in the example of FIG. 2 when focused for an infinite object distance.

DESCRIPTION OF THE PREFERRED EMBODIMENT

Figures 6A, 6B, 6C:
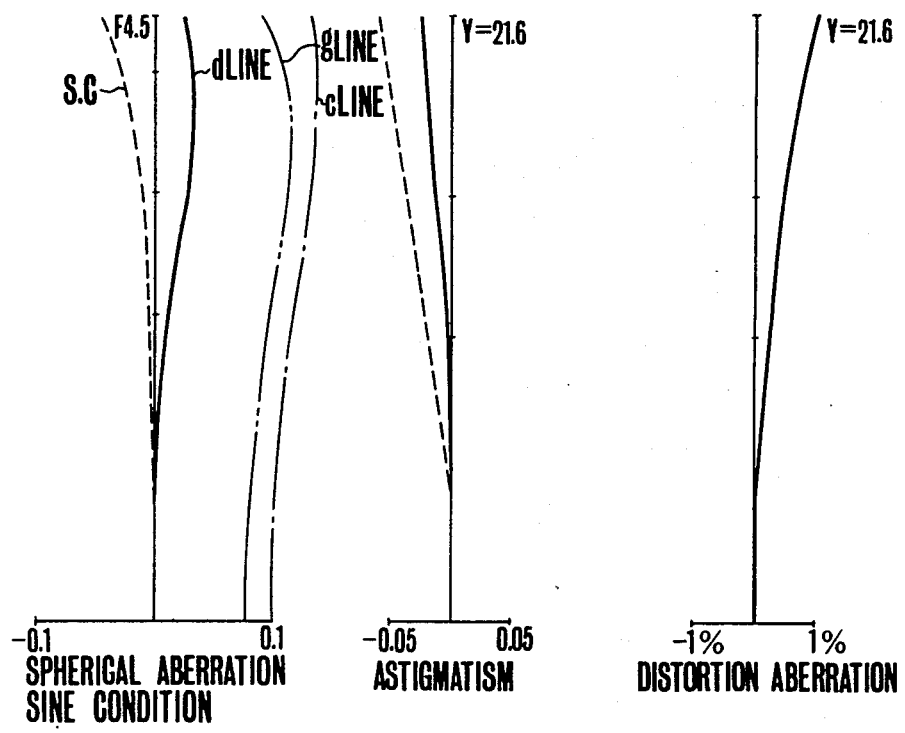
FIGS. 6a–6c is a similar representation when focused for an object distance of 1,000 millimeters.

Referring to FIGS. 1 and 2, there are shown two specific examples of a preferred embodiment of the invention as comprising a front lens group A which has a positive, power and remains stationary during focusing, and a rear lens group which has a negative power and is divided into two parts B and C, the rear part C being made axially movable to effect focusing to suit differing object distances, while the front part B remains stationary during focusing. The stationary part B consists of a negative meniscus singlet lens member in the instance of FIG. 1, or of a negative meniscus doublet lens member in the instance of FIG. 2, with the first refracting surface counting from the front convex to the front, and with the rearmost surface having a radius of curvature which is smallest among all of the surfaces of member B. The movable rear part C is constructed from a negative meniscus doublet lens member with the first surface convex to the front, and with the rearmost surface having a radius of curvature which is smallest among all the surfaces of member C. The absolute focal length of member B is larger than that of member C. A diaphragm D which is stationary is located behind movable member C at a distance to permit the entire range of focusing movement thereof.

As the objective of FIGS. 1 or 2 is focused from the position C marked in solid line for an object at infinity to the position C' marked in broken line for a close object, movable member C progressively approaches the focal plane FP through the space of a distance $\Delta x$ as defined by the following formula $$\Delta x = \frac{-2}{B\left(1 + \sqrt{1 - \frac{4A}{B^2}}\right)}$$

wherein $$A = \frac{1}{F} \cdot \frac{1}{Fc}\left(\frac{S}{Ff} + 1\right)$$

$$B = \frac{1}{Ff}\left(\frac{S_1}{Ff} + 1\right) - \frac{1}{F}\left(\frac{S_1 - O_1}{F} + 1\right)$$

where
$S_1$ is the object distance as measuring from the vertex of the first refracting surface of the objective;
$F$ is the focal length of the complete objective when focused for an infinitely distance object;
$Ff$ is the focal length of the combined group A and member B;
$Fc$ is the focal length of the movable member C; $O_1$ is the distance from the vertex of the first refractings surface to the primary principal point of the complete object; and
$\Delta x$ when measured in a direction to the focal plane takes a plus sign.

In order to facilitate the solution of aberrational problems, it is preferred to specify the characteristics of the members B and C by the following relationships:

$0.4F < |FC| < 0.9F; Fc < 0$      (1)
$0.15F < Rc < 0.25F$      (2)
$0.05 < F(Fcv \cdot Vcv) + f/(Fcc \cdot Vcc) < 0.05$      (3)
$0.05F < Rb < 0.15F$      (4)

wherein
$Rc$ is the radius of curvature of the rearmost surface of the member C;
$Rb$ is the radius of curvature of the rearmost surface of the member B;
$Fcv$ is the focal length of the positive lens element of the member C;
$Vcv$ is the Abbe's number value for the material of the positive lens element of the member C
$Fcc$ is the focal length of the negative lens element of the member C;
$Vcc$ is the Abbe's number value for the material of the negative lens element of the member C.

Condition (1) assists toward achievement of a good compromise between the requirements of providing a large range of focusing adjustment with relatively small axial movement of the movable member C and of providing excellent stabilization of the aberrations throughout the focusing range. When the power of member C is otherwise increased, it is made rapidly more difficult to achieve the desired high standard of aberration correction although the axial translation of member C may be decreased to obtain an equivalent focusing effect. Conversely, the use of a lens member having a power smaller than that corresponding to the upper limit of condition (1) as the focusing member requires a focusing mechanism of increased size due to the increased axial translations of the focusing member.

Condition (2) assists in minimizing the residual aberrations and particularly spherical aberration introduced by the focusing member C to provide a good standard of stabilization of the aberrations throughout the focusing range.

Condition (3) assists in the stabilization with focusing of chromatic aberrations.

The use of a lens member having the parameters within the ranges specified above as the focusing member C results in somewhat under-corrections of the spherical aberration, coma and astigmatism of the complete objective. In order to preserve a good state of correction of the image aberrations, the stationary lens member B of the rear lens group must be designed according to condition (4) to provide correspondingly over-corrected values of the above-identified aberrations.

The specific examples of a telephoto objective of the invention as illustrated in FIGS. 1 and 2 may be constructed in accordance with the numerical data given in Tables 1 and 3 below respectively, in which $R_1, R_2 \ldots$ designate the radii of curvature of the individual surfaces of the objective counting from the front, the positive sign indicating that the surface is convex to the front and the negative sign that it is concave thereto, $d_1$, $d_2 \ldots$ designate the axial separations between successive refracting surfaces of the objective, $N_1, N_2 \ldots$ designate the refractive indices for the spectral d line of sodium of the materials from which the various lens elements of the objective are made, and $V_1, V_2 \ldots$ designate the Abbe numbers of the materials.

Table 1

Distance between surface $R_1$ and the focal plane: 80.01

| | | | |
|---|---|---|---|
| $R_1 =$ | 68.8306 | $d_1 = 3.625$ | $N_1 = 1.48749$   $v_1 = 70.1$ |
| $R_2 =$ | −32.7526 | $d_2 = 2.234$ | |
| $R_3 =$ | −28.0632 | $d_3 = 1.250$ | $N_2 = 1.80610$   $v_2 = 40.9$ |
| $R_4 =$ | −258.3399 | $d_4 = 0.125$ | |
| $R_5 =$ | 40.9645 | $d_5 = 3.250$ | $N_3 = 1.48749$   $v_3 = 70.1$ |
| $R_6 =$ | −55.6211 | $d_6 = 25.005$ | |
| $R_7 =$ | 8.5369 | $d_7 = 1.250$ | $N_4 = 1.58913$   $v_4 = 61.1$ |
| $R_8 =$ | 7.6866 | $d_8 =$ variable | |
| $R_9 =$ | 36.3034 | $d_9 = 0.750$ | $N_5 = 1.75520$   $v_5 = 27.5$ |
| $R_{10} =$ | 108.9485 | $d_{10} = 0.625$ | $N_6 = 1.71300$   $v_6 = 53.9$ |
| $R_{11} =$ | 19.0641 | | |

| Object distance | Focal length of the | Variable axial air |

Table 1-continued

| (from the focal plane) | complete objective | separation($d_8$) |
|---|---|---|
| Infinity | 100.00 | 2.250 |
| −1,000 | 83.48 | 9.656 |

Table 2

Aberration Coefficients for Focussing setting at Infinity

| subscript numerals for the surfaces | I | II | III | P | V |
|---|---|---|---|---|---|
| 1 | 0.6757 | −0.5842 | 0.5051 | 0.4761 | −0.8484 |
| 2 | 48.6504 | −83.9162 | 144.7455 | 1.0006 | −251.3948 |
| 3 | −65.8017 | 111.7576 | −189.8090 | −1.5904 | 325.0728 |
| 4 | −0.0012 | 0.0107 | −0.0965 | 0.1727 | −0.6818 |
| 5 | 3.6943 | −3.9520 | 4.2277 | 0.8000 | −5.3786 |
| 6 | 13.3838 | −24.0086 | 43.0677 | 0.5892 | −78.3138 |
| 7 | 2.6172 | −1.0971 | 0.4599 | 4.3427 | −2.0133 |
| 8 | −3.1924 | 1.1602 | −0.4216 | −4.8231 | 1.9061 |
| 9 | −0.0808 | 0.4612 | −2.6306 | 1.1852 | 8.2442 |
| 10 | 0.0483 | −0.1003 | 0.2081 | −0.0129 | −0.4051 |
| 11 | 0.0711 | 0.1153 | 0.1871 | −2.1833 | −3.2381 |
| Σ | 0.0650 | −0.1535 | 0.4434 | −0.0430 | −7.0508 |

In this table 2, I designates the spherical aberration coefficients; II designates the coma coefficients, III designates the astigmatism coefficients; P designates the Petzval sums, and V designates the distortion coefficients.

Table 3

Distance between surface $R_1$ and the focal plane: 81.05

| | | | |
|---|---|---|---|
| $R_1 =$ | 66.6001 | $d_1 = 3.625$ | $N_1 = 1.48749$ $\nu_1 = 70.1$ |
| $R_2 =$ | −33.1516 | $d_2 = 2.089$ | |
| $R_3 =$ | −28.6739 | $d_3 = 1.250$ | $N_2 = 1.80610$ $\nu_2 = 40.9$ |
| $R_4 =$ | −316.5437 | $d_4 = 0.125$ | |
| $R_5 =$ | 41.3109 | $d_5 = 3.250$ | $N_3 = 1.48749$ $\nu_3 = 70.1$ |
| $R_6 =$ | −57.4105 | $d_6 = 24.974$ | |
| $R_7 =$ | 12.8482 | $d_7 = 0.875$ | $N_4 = 1.71300$ $\nu_4 = 53.9$ |
| $R_8 =$ | 22.5379 | $d_8 = 0.125$ | |
| $R_9 =$ | 22.9059 | $d_9 = 0.500$ | $N_5 = 1.57250$ $\nu_5 = 57.7$ |
| $R_{10} =$ | 10.4573 | $d_{10} =$ variable | |
| $R_{11} =$ | 37.1996 | $d_{11} = 0.750$ | $N_6 = 1.75520$ $\nu_6 = 27.5$ |
| $R_{12} =$ | 96.1965 | $d_{12} = 0.125$ | |
| $R_{13} =$ | 86.0176 | $d_{13} = 0.625$ | $N_7 = 1.71300$ $\nu_7 = 53.9$ |
| $R_{14} =$ | 19.4620 | | |

| Object distance from the focal plane | Focal length of the complete objective | Variable axial air separation ($d_{10}$) |
|---|---|---|
| Infinity | 100.00 | 2.250 |
| −1,000 | 83.73 | 10.208 |

Table 4

Aberration Coefficients when Focussed for Infinity

| | I | II | III | P | V |
|---|---|---|---|---|---|
| 1 | 0.7458 | −0.6867 | 0.6323 | 0.4920 | −1.0354 |
| 2 | 47.8640 | −84.2475 | 148.2877 | 0.9885 | −262.7476 |
| 3 | −64.2813 | 111.5568 | −193.6011 | −1.5565 | 338.6858 |
| 4 | −0.0004 | 0.0068 | −0.1024 | 0.1409 | −0.5765 |
| 5 | 3.6287 | −4.0041 | 4.4184 | 0.7933 | −5.7510 |
| 6 | 12.5609 | −23.0649 | 42.3527 | 0.5708 | −78.8180 |
| 7 | −0.3841 | 0.0296 | −0.0022 | 3.2395 | −0.2494 |
| 8 | 0.4545 | −1.5903 | 5.5646 | −1.8467 | −13.0085 |
| 9 | −0.4543 | 1.5283 | −5.1408 | 1.5894 | 11.9458 |
| 10 | −0.2681 | 0.0431 | −0.0069 | −3.4814 | 0.5608 |
| 11 | −0.0696 | 0.4175 | −2.5021 | 1.1566 | 8.0627 |
| 12 | 1.6256 | −3.5645 | 7.8158 | −0.4472 | −16.1570 |
| 13 | −1.4736 | 3.2945 | −7.3652 | 0.4838 | 15.3839 |
| 14 | 0.0726 | 0.1110 | 0.1699 | −2.1386 | −3.0112 |
| Σ | 0.0205 | −0.1703 | 0.5207 | −0.0154 | −6.7157 |

It will be appreciated from the foregoing description that, with a telephoto objective consisting of a convergent front lens group and a divergent rear lens group, the present invention provides a two part rear lens group, only one part of which is axially movable for focussing purposes, thereby giving rise to the possibility of achieving a high standard of aberration stabilization throughout the range of focussing movement. Therefore, by comparison with a conventional telephoto objective which is made bodily movable for focussing, or which has a front lens group movable for focussing, the objective of the invention is improved with respect to the focussing manupulation owing to the decreased weight and bulk of the complete objective, which will in turn reduce the probability of producing an oscilation of the image at the focal plane when it is used in association with a hand-held camera. On the other hand, by comparison with a conventional telephoto objective having a rear lens group which made bodily movable for focussing, the objective of the invention is remarkably improved with respect to the imaging performance owing to the stationary part of the rear lens group which is designed to provide improved stabilization of the various aberrations throughout the focussing range. It is to be noted that the present invention is not limited to use in the construction of three-component telephoto objective described and is useful to facilitate the design of the focussing member for any telephoto lens including additional lens components of almost zero powers located in front of, or behind the front part B, or behind the rear part C of the rear lens group, and that further assistance in achieving a higher standard of correction of the image aberrations can be obtained if an additional component which remains stationary during focussing is employed for arrangement between the front and rear lens groups.

Figure 7:
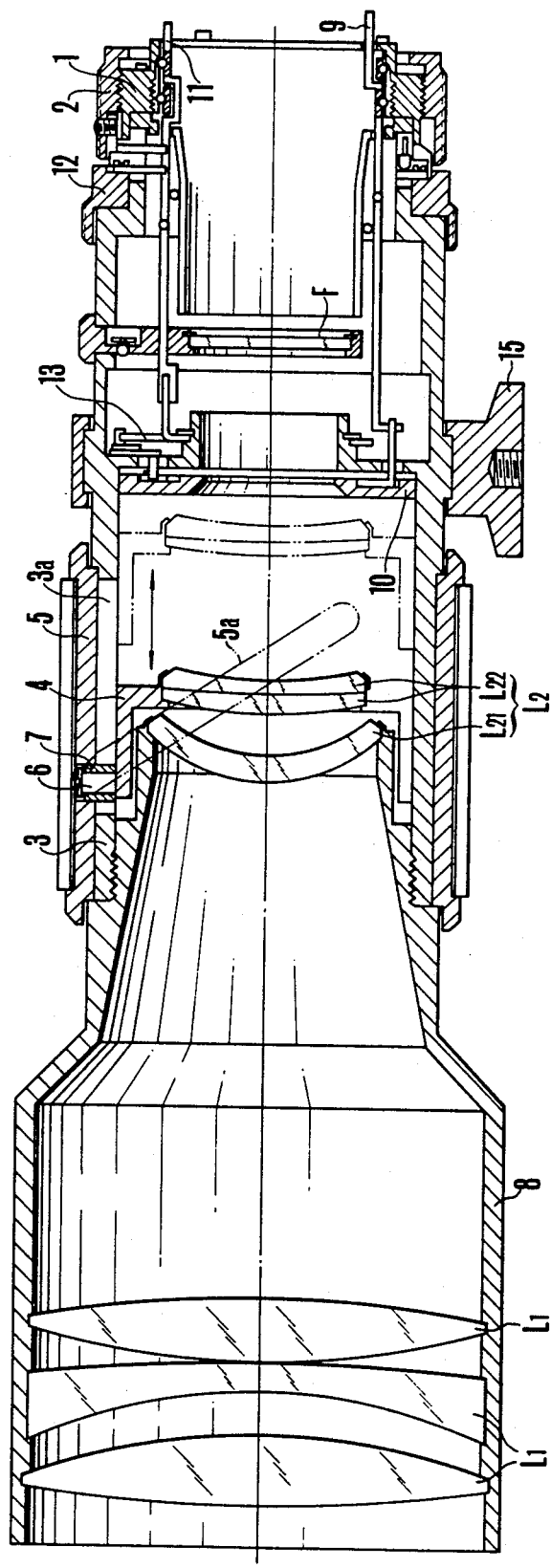
FIG. 7 is an axial sectional view of a barrel type mechanical mounting with a focusing mechanism adapted for use with the objective of the invention.

Referring now to FIG. 7, there is shown a lens mount with a cam-operated focussing mechanism adapted for use with the telephoto objective of the character described, where $L_1$ and $L_2$ designate the front and rear lens groups of the objective respectively, and $L_{21}$ and $L_{22}$ designate the stationary front and movable rear parts of the rear lens group $L_2$ respectively. This lens mount is connected to a single lens reflex camera, not shown, by an adapter 2 whose rear end constitutes a bayonet coupling engaging the camera housing. Rigidly connected to adapter 2 is a barrel 1 at one end thereof, the opposite end portion of which has a guide barrel 3 fixedly secured thereto and provided with a longitudinally elongated guiding slot 3a. Mounted within guide barrel 3 is a slidable sleeve 4 carrying the movable lens member $L_{22}$. The sleeve 4 can be moved longitudinally but can not be rotated with reference to barrel 3, as it is prevented from rotating by a pin 6 outwardly radially extending from the slidable sleeve 4 and provided with a roller rotatable thereabout in the guiding slot 3a. The roller 7 projects beyond the guiding slot 3a and engages with a herical camming groove 5a formed in the inner surface of a focus adjusting sleeve 5 which is rotatably mounted on guide barrel 3. The parts, 3a, 5, 5a, 6 and 7 constitutes the above mentioned camo perated focusing mechanism. Rigidly coupled to guide barrel 3 is a tubular extension 8 carrying the front lens group $L_1$ and the front part $L_{21}$ of the rear lens group $L_2$ mounted therein in fixed relation to each other and to the extension 8. The lens mount has a diaphgram device 10 mounted therein at a location behind the movable lens member $L_{22}$. The diaphragm device 10 is provided with a control lever 9, and a presetting lever 11 cooperating with a diaphgram adjusting ring 12 rotatably mounted on barrel 1. The control lever 9 serves to adjust the diaphragm device 10 to a preselected setting in response to an actuation of a camera release member. The presetting lever 11 serves to adjust the position of a diaphragm blade-operating cam member 13 in accordance with the preselected diaphragm value by the ring 12, and also to transmit the diaphragm information to a diaphragm control mechanism not shown in the camera housing in response to a rotation of ring 12. A filter being mounted in a filter holder 14 which is detachably mounted behind the diaphragm device 10 in the barrel 1. The lens mount is further provided with a support member 15 having a nut formed therein for engagement with a bolt of a tripod not shown.

The operation of the focussing mechanism of FIG. 7 in connection with the diaphragm device 10 which constitutes a part of the exposure control apparatus of the camera. In order to make an exposure in the diaphragm preselection automatic exposure range, the operator turns the ring 12 to select a desired diaphragm value, thereby the position of the cam member 13 is adjusted through the presetting lever 11. At the same time, the diaphragm information is introduced to the exposure control apparatus in the camera through the presetting lever 11. On the other hand, when the camera is switched to the shutter preselection automatic exposure range, the position of the cam member 13 is adjusted in accordance with a computed diaphragm value through the presetting lever 11.

In focussing the objective, the operator turns the rotary sleeve 5, thereby the roller 7 is driven for movement along the guiding slot 3a through the roller 7 and camming groove 5a connection, causing axial translation of the slidable sleeve 4 with the lens member $L_2$ therein. What object the objective has been focussed for is recognizable either by the angular position of sleever 5, or by looking through the viewfinder in which an image of the corresponding object is formed in sharpest focus. Next, the operator may depress the shutter release button not shown, thereby the diaphragm device 10 is first operated to the preselected setting through the control lever 9, and thereafter the shutter mechanism is actuated to initiate an exposure.

The filter holder 14 is removably attached to the lens barrel so that various filters may be interchanged. When the filter is not used, it is desirable to use a transparent plate to adjust the optical path length.

Figure 8:
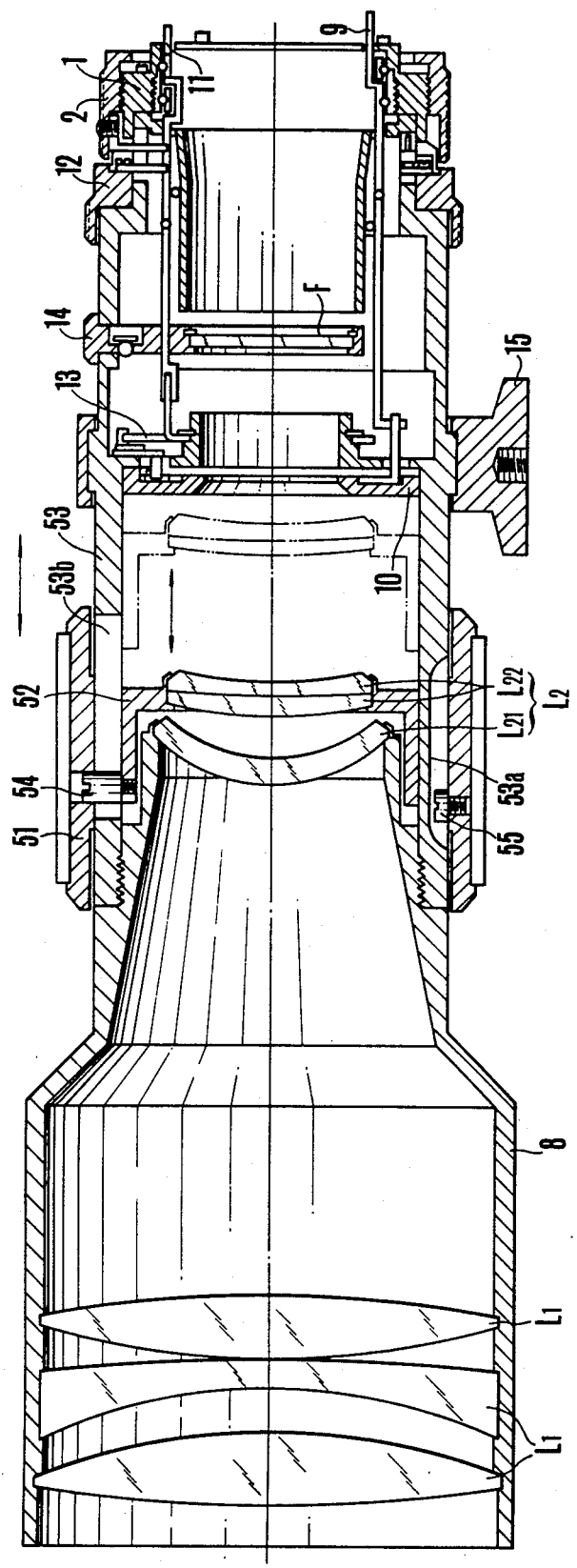
FIG. 8 is a similar view with a modification of the focusing mechanism.

FIG. 8 shows a modification of the focussing mechanism of FIG. 7 with employment of a longitudinally slidable focus-adjusting sleeve 51 in place of the rotary sleeve 5 of FIG. 7. The sleeve 51 is fixedly connected to a slidable sleeve 52 carrying the movable lens member $L_{22}$ through a pin 54 extending through a longitudinally elongated guiding slot 53b provided in the guide barrel 53 corresponding to the guide barrel 3 of FIG. 7. In order to define the range of possible focussing movements of the lens member $L_{22}$, there is provided a longitudinal groove 53a formed in the outer surface of guide barrel 53 for engagement with a pin 55 internally radially extending from the focus adjusting sleeve 51. In focussing the objective, the operator moves the external sleeve 51 to effect axial translation of the lens member $L_{22}$, as the internal sleeve 52 is guided through the pin 54 and guiding slot 53b connection.

Figure 9:
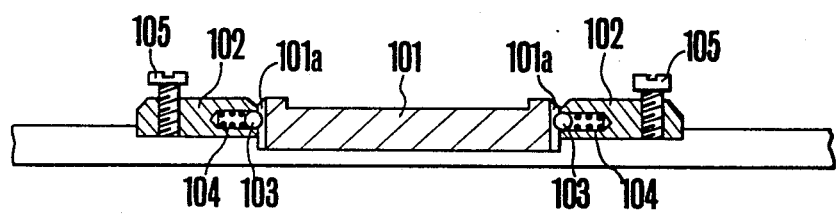
FIG. 9 is a fragmentary sectional view of a focus-preselecting device in the focusing mechanism of FIGS. 7 or 8.

FIG. 9 shows a focussing position preselecting device particularly adapted for association with the focussing mechanism of FIG. 7. The device comprises a pair of radially grooved recesses 101a formed at the ends of a focus adjusting sleeve 101 corresponding to the sleeve 5 of FIG. 7 in longitudinal alignment with each other, a pair of click stop balls 103 which are biased by respective springs 104 in the opposite directions to each other for normal engagement with the respective recesses 101a, and a pair of focus presetting rings 102 rotatably mounted on the guide barrel corresponding to the part 3 of FIG. 7. The rings 102 each has a hole longitudinally bored therein for the mounting of ball 103 and spring 104, and are provided with respective fasteners having knobs 105. In operating the device, the rings 102 are turned as a unit to place the reaction points thereof in registry with a graduation representing a desired object distance for which the objective is to be focussed, and then are secured in position fixed to the guide barrel by means of the operated knobs 105. With this arrangement, when the focus adjusting sleeve 101 is turned to a position where the recesses 101a engage with balls 103, the desired focussing effect is automatically obtained.

It will be appreciated form FIGS. 7, 8 and 9 that the present invention provides a focussing mechanism of simple construction which may be incorporated in the lens mount for the telephoto objective of the character described at a location close to the center of the physical length of the complete objective including the lens mount and, in some cases, of the center of gravity of the objective and camera assembly. Such a central location of the focussing mechanism permits easy management procedures for high speed smooth focus adjustments of the objective, while holding the assembly by hand, and accordingly faciliates to prevent the production of an oscillation of the image at the film plane which would be otherwise introduced by the small accidental motions of the assembly owing to the difficult manupulation thereof and the necessity of large driving torque in operation of focussing mechanism. Furthermore, the constructions of the telephoto objective of the character described and the focussing mechanism therefor are advantageous for the provision of focussing down to a shorter object distance.

What is claimed is:

1. A telephoto objective of high speed adjustable focus comprising a front lens group which has a positive refracting power and remains stationary during focussing, and a rear lens group which is divided into two parts, of which one part is axially movable to effect focussing to suit differing object distances, wherein said movable part of said rear lens being located behind the other part which is stationary during focussing and wherein the characteristics of the various lens elements of said front and rear lens groups and their spatial relationships to each other are substantially of the proportions indicated by the numerical data in the following table, in which R designates the radii of curvature of the refracting surfaces identified by the corresponding subscript numerals and numbered from the front to the rear of the objective, the positive sign indicating that the surface is convex to the front and the negative sign that it is concave thereto, D designates the axial separations between successive refracting surfaces of the objective being numbered from the front to the rear; N designates the refractive indices for the spectral D line of sodium of the materials of the elements being numbered from the front to the rear; and $\nu$ designates the Abbe numbers of the materials:

Distance between surface $R_1$ and the focal plane: 80.01

| | | | |
|---|---|---|---|
| $R_1 =$ 68.8306 | $d_1 = 3.625$ | $N_1 = 1.48749$ | $\nu_1 = 70.1$ |
| $R_2 =$ −32.7526 | $d_2 = 2.234$ | | |
| $R_3 =$ −28.0632 | $d_3 = 1.250$ | $N_2 = 1.80610$ | $\nu_2 = 40.9$ |
| $R_4 =$ −258.3899 | $d_4 = 0.125$ | | |
| $R_5 =$ 40.9645 | $d_5 = 3.250$ | $N_3 = 1.48749$ | $\nu_3 = 70.1$ |
| $R_6 =$ −55.6211 | $d_6 = 25.005$ | | |
| $R_7 =$ 8.5369 | $d_7 = 1.250$ | $N_4 = 1.58913$ | $\nu_4 = 61.1$ |
| $R_8 =$ 7.6866 | $d_8 =$ variable | | |
| $R_9 =$ 36.3034 | $d_9 = 0.750$ | $N_5 = 1.75520$ | $\nu_5 = 27.5$ |
| $R_{10} =$ 108.9485 | $d_{10} = 0.625$ | $N_6 = 1.71300$ | $\nu_6 = 53.9$ |
| $R_{11} =$ 19.0641 | | | |

| Object distance from the focal plane | Focal length of the complete objective | Variable axial air separation($d_8$) |
|---|---|---|
| Infinity | 100.00 | 2.250 |
| −1,000 | 83.48 | 9.656 |

2. A telephoto objective of high speed adjustable focus comprising a front lens group which has a positive refracting power and remains stationary during focussing, and a rear lens group which is divided into two parts of which one part is axially movable to effect focussing to suit differing object distances, wherein said movable part of said rear lens being located behind the other part which is stationary during focussing and wherein the characteristics of the various lens elements of said front and rear lens groups and their spatial relationships to each other are substantially of the proportions indicated by the numerical data in the following table:

Distance between surface $R_1$ and the focal plane: 81.05

| | | | |
|---|---|---|---|
| $R_1 =$ 66.6001 | $d_1 = 3.625$ | $N_1 = 1.48749$ | $\nu_1 = 70.1$ |
| $R_2 =$ −33.1516 | $d_2 = 2.089$ | | |
| $R_3 =$ −28.6739 | $d_3 = 1.250$ | $N_2 = 1.80610$ | $\nu_2 = 40.9$ |
| $R_4 =$ −316.5437 | $d_4 = 0.125$ | | |
| $R_5 =$ 41.3109 | $d_5 = 3.250$ | $N_3 = 1.48749$ | $\nu_3 = 70.1$ |
| $R_6 =$ −57.4105 | $d_6 = 24.974$ | | |
| $R_7 =$ 12.8482 | $d_7 = 0.875$ | $N_4 = 1.71300$ | $\nu_4 = 53.9$ |
| $R_8 =$ 22.5379 | $d_8 = 0.125$ | | |
| $R_9 =$ 22.9059 | $d_9 = 0.500$ | $N_5 = 1.57250$ | $\nu_5 = 57.7$ |
| $R_{10} =$ 10.4573 | $d_{10} =$ variable | | |
| $R_{11} =$ 37.1996 | $d_{11} = 0.750$ | $N_6 = 1.75520$ | $\nu_6 = 27.5$ |
| $R_{12} =$ 96.1965 | $d_{12} = 0.125$ | | |
| $R_{13} =$ 86.0176 | $d_{13} = 0.625$ | $N_7 = 1.71300$ | $\nu_7 = 53.9$ |
| $R_{14} =$ 19.4620 | | | |

| Object distance from the focal plane | Focal length of the complete objective | Variable axial air separation ($d_{10}$) |
|---|---|---|
| Infinity | 100.00 | 2.250 |
| −1,000 | 93.73 | 10.208 |

3. A telephoto objective of high speed adjustable focus comprising:
a front lens group which has a positive refracting power and remains stationary during focussing; and
a rear lens group having a negative refracting power and composed of a stationary sub-group and at least one movable sub-group, said movable sub-group having a negative refracting power, a frontmost surface of which has a convex face toward the object, said movable sub-group being moved on the optical axis toward an image so as to cause the telephoto object to focus an object at a near distance from its focussing on an object at a far distance.

4. A telephoto objective according to claim 3, in which said stationary sub-group is arranged nearer the object than said movable sub-group.

5. A telephoto objective according to claim 3, in which said stationary sub-group has a negative refractory power and its frontmost surface is convex toward the object.

6. A telephoto objective according to claim 5, in which said stationary sub-group is a negative meniscus lens.

7. A telephoto objective according to claim 5, in which said stationary sub-group comprises a positive meniscus lens and a negative meniscus lens arranged in the written order.

8. A telephoto objective according to claim 3, wherein the absolute focal length of said stationary sub-group is larger than that of said movable sub-group.

9. A telephoto objective according to claim 8, in which said stationary sub-group comprises a positive meniscus lens and a negative meniscus lens arranged in the written order.

10. A telephoto objective according to claim 3, in which said front lens group comprises a positive lens, a negative lens and a positive lens.

11. A telephoto objective according to claim 10, in which said positive lenses is a biconvex lens, and said negative lens, is a negative meniscus lens having its concave face toward the object.

12. A telephoto objective of high speed adjustable focus comprising:
a primary lens group which comprises at least three lenses, has a positive refracting power and is stationary at a constant distance from the focal plane;
a middle lens group which is on the image side axially apart from said primary lens group and has a negative refracting power and front lens-surface of which group faces toward the object; and
a rearmost lens group which is first behind said middle lens group and has a negative refracting power, and comprises at least one positive lens and at least one negative lens, said rearmost lens group moving axially to the image side when refocussing is done from an object far from the object to an object near the object.

13. A telephoto objective according to claim 12, in which said primary lens group comprises a biconvex lens, a negative lens having the concave face toward the object and a positive lens arranged in the written order from the object side.

14. A telephoto objective according to claim 12, in which said middle lens group comprises a negative meniscus lens.

15. A telephoto objective according to claim 12, in which said rearmost lens group comprises a positive meniscus lens and a negative lens arranged in the written order from the object side.

16. A telephoto objective of high speed adjustable focus comprising a front lens group which has a positive refracting power and remains stationary during focussing, and a rear lens group which is positioned on the image side axially apart from said front lens group and has a negative refracting power, said rear lens group being divided into two parts of which one part is axially movable to effect focussing to suit differing object distance, and the other part has a negative refracting power and stationary during focussing.

17. A telephoto objective according to claim 16, wherein said movable part of said rear lens group is located behind the other part which is stationary during focussing.

18. A telephoto objective according to claim 16, wherein said movable part of said rear lens group is located behind the other part which is stationary during focussing and composed of a plurality of lenses.

19. A telephoto objective according to claim 18, wherein said movable lens part of said rear lens group has a rearmost surface concave to the rear, and said rearmost surface has a radius of curvature which is smallest among all the surfaces of said movable part.

20. A telephoto objective according to claim 16, wherein said stationary part of said rear lens group has a frontmost surface convex to the front.

21. A telephoto objective according to claim 20, wherein said stationary part has a rearmost surface concave to the rear, and said rearmost surface has a radius of curvature which is smallest among all the surfaces of the stationary part.

22. A telephoto objective according to claim 16, wherein the movable part of said rear lens group has a negative refracting power, and the absolute focal length of the stationary part of said rear lens group is larger than that of said movable part, wherein said movable part is moved on the optical axis toward the image so as to cause the objective to focus an object at near distance from its focusing on an object at infinite distance.

* * * * *